United States Patent [19]
Polites et al.

[11] Patent Number: 5,396,815
[45] Date of Patent: Mar. 14, 1995

[54] SUSPENSION SYSTEM FOR GIMBAL SUPPORTED SCANNING PAYLOADS

[75] Inventors: Michael E. Polites; Dean C. Alhorn, both of Huntsville, Ala.

[73] Assignee: The United States of America as represented by the Administrator of the National Aeronautics and Space Administration, Washington, D.C.

[21] Appl. No.: 123,629

[22] Filed: Sep. 15, 1993

[51] Int. Cl.6 .................... F16H 33/20; B64G 1/66
[52] U.S. Cl. ................................ 74/61; 74/87; 244/158 R; 343/765; 343/766
[58] Field of Search ............... 74/61, 87; 244/158 R; 343/765, 766

[56] References Cited

U.S. PATENT DOCUMENTS

| | | | |
|---|---|---|---|
| 3,008,336 | 11/1961 | Leduc | 74/61 |
| 4,266,434 | 5/1981 | Burns | 74/61 |
| 5,014,564 | 5/1991 | Culkin | 74/61 |
| 5,129,600 | 7/1992 | Polites | 74/61 |

Primary Examiner—Allan D. Herrmann
Attorney, Agent, or Firm—Robert L. Broad, Jr.; Guy M. Miller; Alan J. Kennedy

[57] ABSTRACT

Gimballed scanning devices are an important aspect of space science. To achieve a scan pattern some means must be provided which impart to the devices an oscillatory motion. Various forms of machines have been employed for controllably conferring scan patterns on these scanning devices. Although they have included control moment gyroscopes, reaction wheels, torque motors, reaction control systems, and the like, rotating unbalanced mass (RUM) devices are a new and more efficient way to generate scans in gimballed devices or payloads. But they require power consuming and frequently complex auxiliary control systems to position and reposition the particular scan pattern relative to a target or a number of targets. Herein the control system is simplified. In the suspension system provided for payloads rotatably supported in gimbals payload rotation is restricted by a flex pivot so that the payload oscillates, moving in a scan pattern.

13 Claims, 3 Drawing Sheets

SUSPENSION SYSTEM FOR GIMBAL SUPPORTED SCANNING PAYLOADS

ORIGIN OF THE INVENTION

The invention described herein was made by employees of the United States Government and may be manufactured and used by or for the Government of the United States of America for Governmental purposes without payment of any royalties thereon or therefor.

FIELD OF THE INVENTION

This invention in one of its aspects relates to devices such as scientific instruments mounted in gimbals. In another of its aspects the invention pertains to gimballed scanning devices or instruments focused on objects in outer space. In a still more specific aspect the invention is concerned with instruments whose scanning is produced by rotating unbalanced mass devices, and to suspension systems for such instruments.

BACKGROUND OF THE INVENTION

As can be imagined scanning is an important aspect of space science. In addition to their use in scanning the earth and other planets, x-ray, gamma-ray, and similar scanning instruments perform important functions in space exploration, Examples are sensors, telescopes and electronic devices on platforms such as a space shuttle, a space station, on experimental balloons, and on free-flying spacecraft.

Three general types of scan patterns are well known. The first is a circular scan, in which the line of sight is repeatedly traced in a circle. The second type of scan pattern is a line scan. Here the line of sight is linear, with the scanning device moving back and forth in a line. The third form of scan pattern is a raster scan, which is based on a line scan further complemented with some relatively slower motion, usually perpendicular to the original line scan.

To achieve the scan pattern some means must be provided which impart to the payload an oscillatory motion. Such drive means are generally known, particularly in space exploration. Various forms of machines or apparatus have been employed for controllably conferring on scanning instruments predetermined scan patterns. They include control moment gyroscopes, reaction wheels, torque motors, reaction control systems, and various combinations of such apparatus. However, one disadvantage of utilizing such scan generating devices is power consumption. For this reason, whether scanning a ground based, space based, or balloon borne gimballed payload a preferred drive means which is particularly effective is a rotating unbalanced mass or RUM device. This device is the subject of my U.S. Pat. No. 5,129,600. RUM devices are a new and efficient way to generate scans in gimballed payloads such as x-ray telescopes or other scientific instruments.

A RUM device consists of a mass, m, on a lever arm r, located at a distance, d, from the center-of-mass of the gimballed payload on which it is mounted. The mass is driven at a constant angular velocity $\omega$ which produces a cyclical centrifugal force $m\omega^2 r$ on the payload. This force, in turn, produces a cyclic torque, about the payload center-of-mass, with an amplitude of $m\omega^2 rd$. Two RUM devices are required to scan gimballed payloads. They are mounted on each end of the payload and they rotate 180° out-of-phase producing a cyclic torque couple with an amplitude of $2 m\omega^2 rd$.

RUM devices are superior to previous scanning apparatus in terms of power, weight, cost, and accuracy, but there are still certain disadvantages accompanying their use. Even though power requirements are less than in other scan generating devices there is still room for improvement. RUM devices require an auxiliary control system to position and reposition the scan pattern relative to a target or a number of targets. The auxiliary control system is also required if a raster scan pattern is to be generated by the RUM device. It confers on the payload a slow complementary motion perpendicular to the line scan to form the raster scan.

All auxiliary control systems known to be suitable for use with RUM devices require the use of some type of feedback control. Generally rate and position sensors are mounted on the spacecraft, the payload, or the payload gimbals. Spacecraft or payload mounted sensors include sun sensors, star trackers, and rate gyros. Gimbal mounted sensors include encoders, resolvers, and tachometers. The outputs of these units are sent to a control computer where they are compared with calculated rate and position commands that correspond to the desired scan pattern. Any differences between the actual and the commanded rate or the current and desired position result in torque commands to the auxiliary control actuators. The spacecraft or payload rate and position commands in the control computer require synchronization with the position and rate commands of the RUM devices in order for the RUMs and the auxiliary control system to work together synergistically. It will be appreciated that this is not a simple operation. To accomplish it the auxiliary control system usually includes torque motors, tachometers and resolvers on the gimbals, as well as a two axis sun sensor and rate gyro on the scanning device. These systems are obviously complex, and consume power saved by the RUM devices. It can be seen then that there is room for improvement even in RUM actuated scanning devices. Such improvements are provided herein.

SUMMARY OF THE INVENTION

Scanning instruments or devices are widely used in space exploration, and in the spraying of fine particles. The most frequently employed method for achieving the various scan patterns is to gimbal the scanning device. This means that the gimbal or gimbals must be so suspended that they can be activated to generate the scan pattern. Such a suspension system is provided herein. It is a suspension means for payloads rotatably supported in gimbals wherein payload rotation is restricted so that the payload moves in a scan pattern. It includes a gimbal and a payload to be supported in the gimbal. A first axle means has one of its ends attached to one side of the payload and its other end attached to the gimbal. A second axle means has one of its ends attached to the gimbal, and its other end attached to the other side of the payload. The first axle means also has one of its ends journaled to permit payload rotation. The second axle means on the other hand is a flex pivot, flexible about a torsional moment, but inflexible about bending moments. This construction restricts payload rotation, effecting oscillation of that payload. The rotation of the payload is limited by the torsional spring constant of the flex pivot. Drive means impart an oscillatory motion to the payload to effect its scan pattern. Positioning means coupled with the flex pivot are adapted to hold the flex pivot in a fixed position and to turn the flex pivot when the positioning means are actuated.

THE DRAWINGS

The suspension system of the invention can, perhaps, best be understood from a description of the system in conjunctions with the accompanying drawings.

Figure 6:
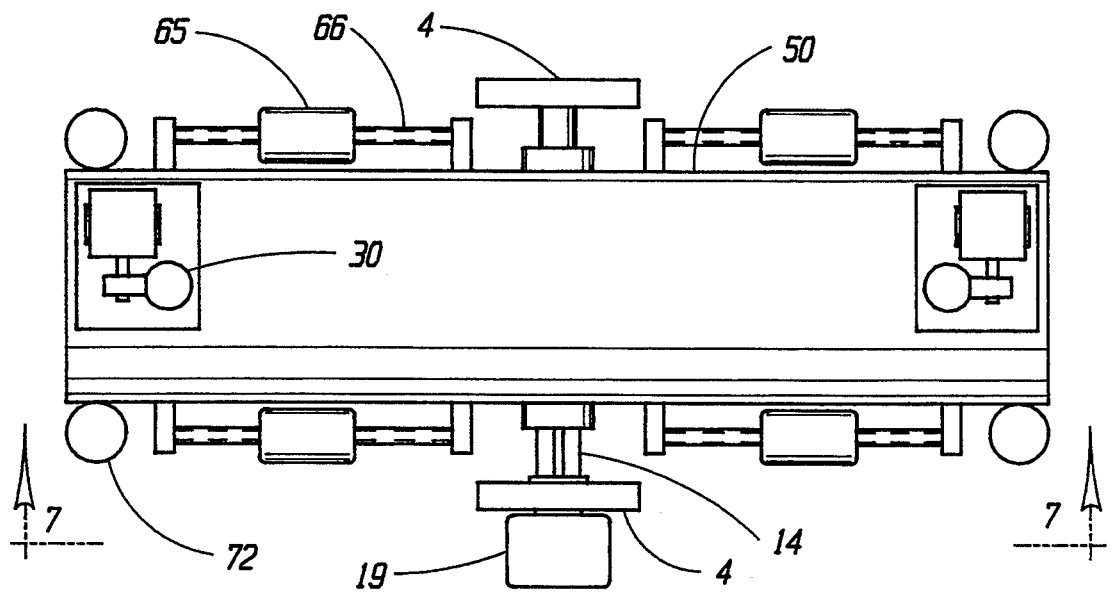
Figure 7:
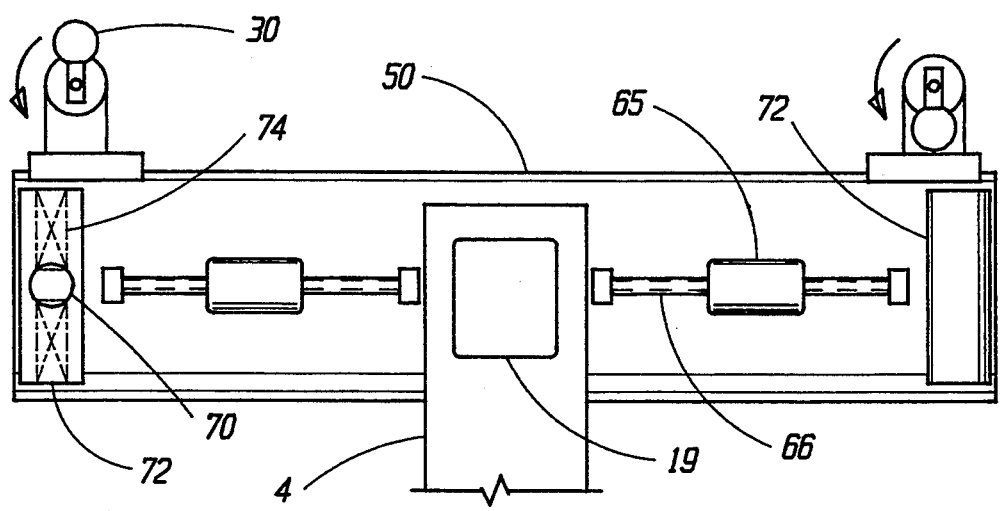

FIGS. 6, and 7 schematically illustrate trim and damping modifications of the invention.

DETAILED DESCRIPTION OF THE INVENTION

Figure 1:
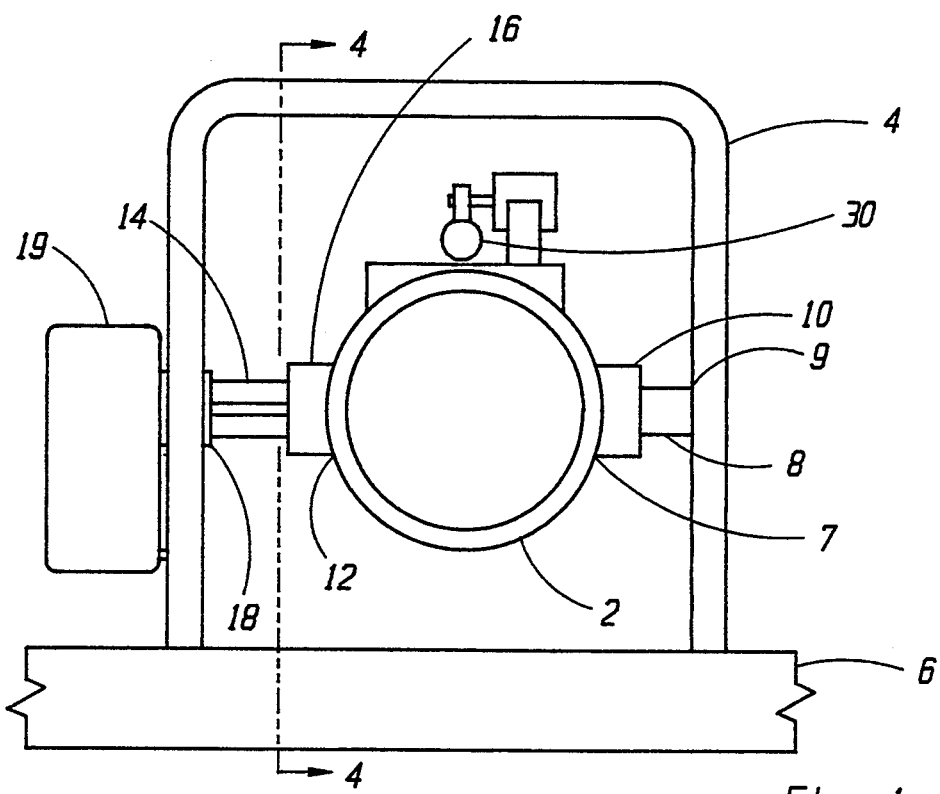
FIG. 1 is a schematic view of a simplified version of the invention.

A single gimbal suspension system for linear scanning is shown in FIG. 1. An instrument or payload 2 is carried by a gimbal 4 through an axle system to be described. In some instances gimbal 4 will be a ring. In the embodiment herein the base of the gimbal is embedded in or secured to a platform 6. In order to permit payload movement the axle system includes two axle means. One of the axle means is an axle, and one side of the payload is attached at 7 to one end of this axle 8. The other end of axle 8 is attached to gimbal 4 at 9. To allow movement or rotation of the payload, insofar as possible, axle 8 is journaled in housing 10 holding bearings in a race or otherwise (not shown).

The other axle means is a flex pivot, and the other side 12 of payload 2 is supported by this flex or flexural pivot 14. Unlike axle 8 flex pivot 14 is not journaled or otherwise adapted for rotation. Rather it is firmly secured to block 16. Flex pivots have been used as engine mounts, camera telescope mounts, engine supports, gimbal supports, and as trunnion pivots. However in such apparatus they were firmly anchored, structural support members. Herein the outer end 18 of flex pivot 14 is locked in a positioning means 19.

Positioning means are well known and include gears, stepper motors, cams, pitman arms, linkages, and even pulleys. A preferred positioning means for use herein is a stepper motor in combination with a gear train such as that shown in FIG. 2. Flex pivot 14 is shown attached to a gear train 20 which is controlled by stepper motor 22. Encoder 24 will be described in connection with the operation of the device.

To achieve the scan pattern some means must be provided which imparts to the payload an oscillatory motion. Such devices have been described hereinbefore, and any of these can be employed herein. Since rotating unbalanced mass or RUM devices are superior to the others such devices are preferred herein. They are illustrated as units 30 in FIG. 1. The operation of the device shown in FIG. 1 can, then, now be considered.

It will be noted that the apparatus shown in FIG. 1 is a single axis gimbal. This means that the payload illustrated in FIGS. 1 and 4, moves in a line scan. For circular scans two gimbals are required as will be described.

Figure 2:
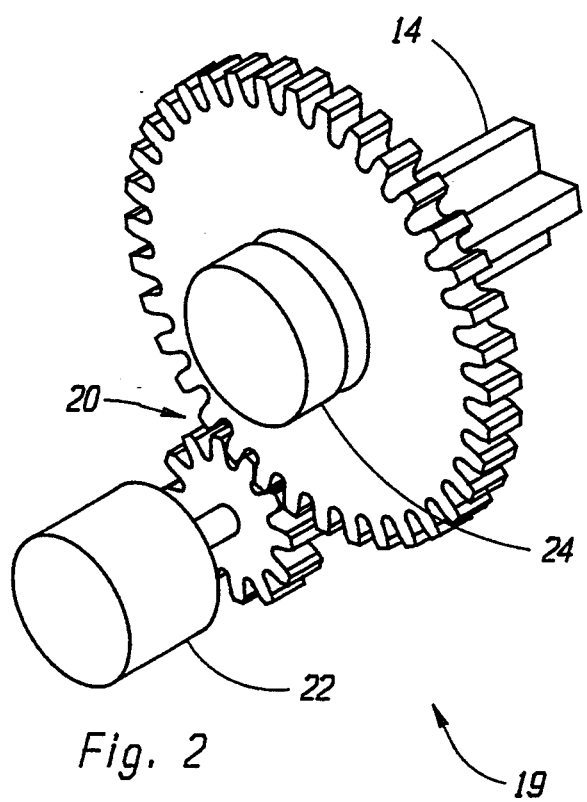
FIG. 2 is an isometric view of a payload repositioning mechanism.
Figure 4:
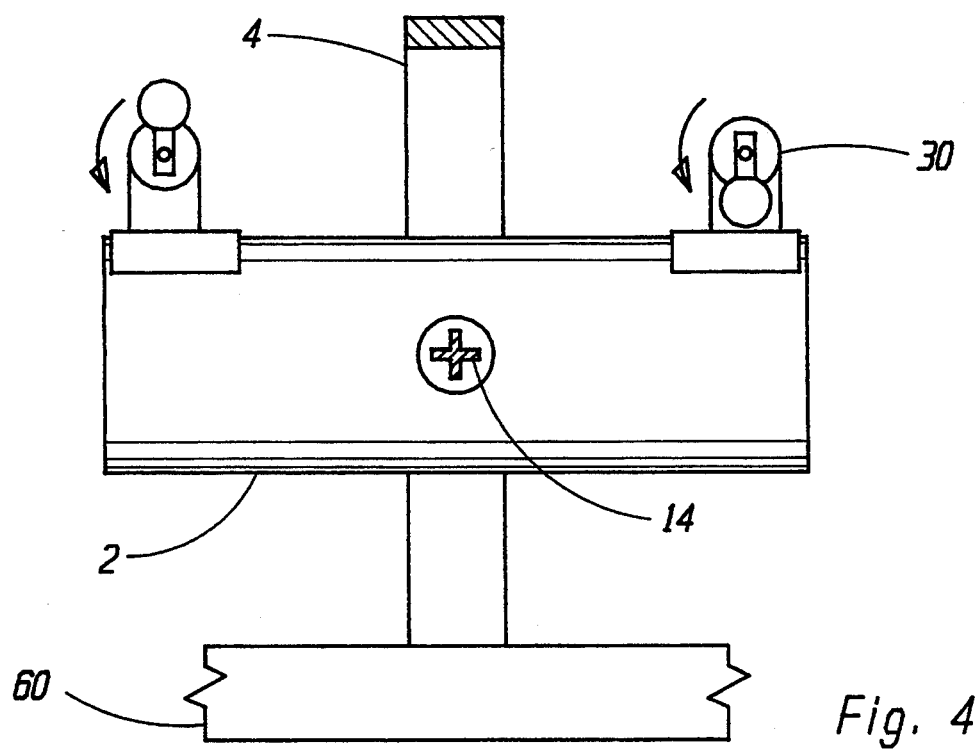
FIG. 4 is a section taken through 4—4 of FIG. 1, illustrating the operation of the invention.

The RUM positioning means 19 operates in two open-loop modes. In the positioning mode, open-loop step commands are issued to that positioning means in order to position or reposition the payload center-of-scan in one axis. The preferred positioning means herein consists of a stepper motor 22, an N:1 gear train 20, a flex pivot 14, and an encoder 24. FIG. 2 is a sketch of such a device, which for clarity, shows a simple one pass gear train. The stepper motor stator is attached to the support structure. The rotor is connected to the low torque side of the gear train and the flex pivot is connected to the high torque side. The other end of the flex pivot is attached to the payload. The encoder is mounted on the high torque side of the gear train and provides a position measurement of the payload center-of-scan. The payload center-of-scan is measured by encoder 24. An operator issues step commands to stepper motor 22 until he observes that the measured payload position matches the desired centered position. Stepper motor 22 actuates gear train 20, which in turn partially rotates, or turns flex pivot 14 as can be seen in FIGS. 2 and 4. The payload is now ready for scanning. The RUM devices begin to rotate at a prescribed constant angular velocity, while being maintained 180 out-of-phase with respect to each other. This produces the desired scan.

Figure 3:
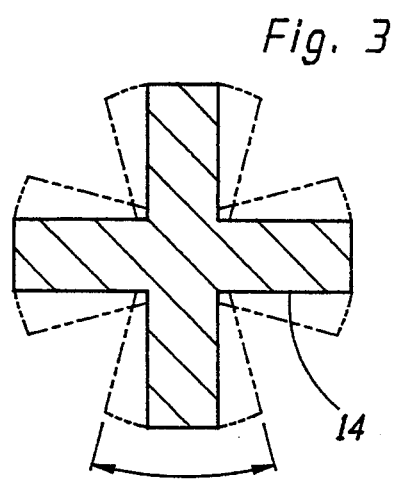
FIG. 3, is a diagrammatic view illustrating the movement of a flex pivot employed herein.

During scanning, due to the flexibility of flex pivot 14 in the scan axis, further rotation is restricted in both directions as shown in FIG. 3. In addition, the holding torque of stepper motor 22, amplified by the gear train 20 (FIG. 2), creates a large restoring torque that prevents the center-of-scan from drifting.

As indicated, for line and raster scanning, a single gimbal device such as that in FIGS. 1 and 4 is necessary. Only the mechanism on the scan axis has a flex pivot, since scanning is performed only in this axis. Any positioning device in the other axis, without the flex pivot, is used only to reposition the scan in this axis and/or to provide the slow complementary motion for raster scanning.

Figure 5:
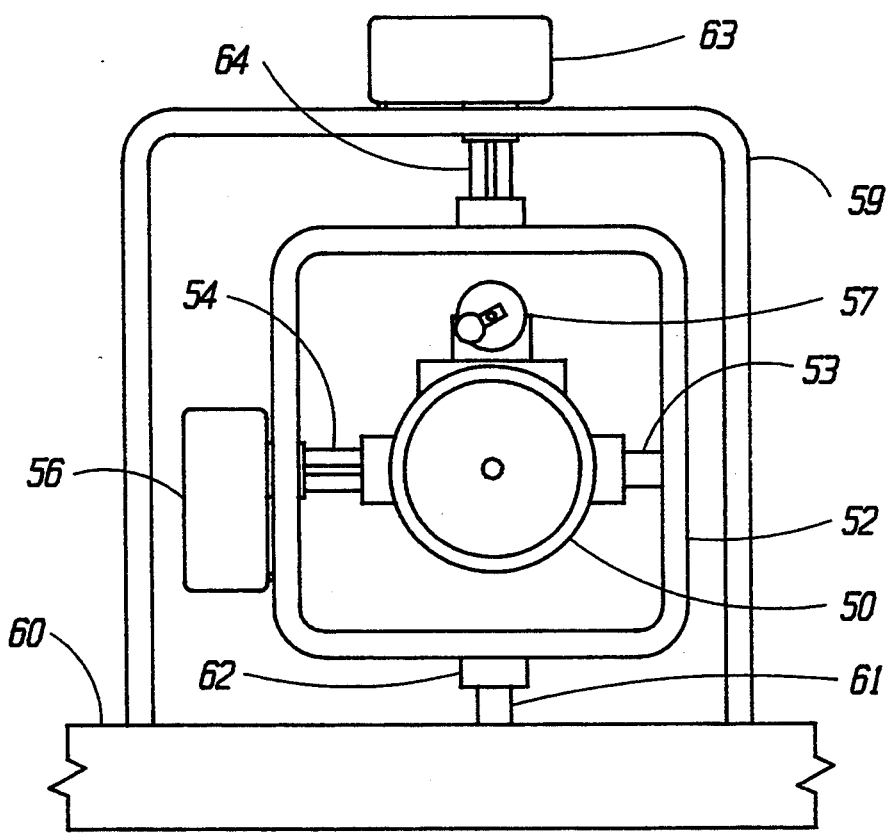
FIG. 5 is a schematic view illustrating a preferred embodiment of the invention.

For circular scanning, two gimbals and two positioning means are employed, and each positioning means will have its flex pivot. This preferred embodiment is illustrated in FIG. 5. The scanning payload 50 is carried by an inner gimbal 52 by means of axle 53 and flex pivot 54 as described in conjunction with FIGS. 1 and 4. Positioning means 56 and RUM device 57 are also shown in FIG. 5. In addition a second gimbal 59 is incorporated in the apparatus. This is an outer gimbal 59 which can be freely suspended, or carried by a platform as in FIG. 5. When the payload is gimballed in two axes, each gimbal axis has a positioning means 56 and 63 as seen in FIG. 5. When the payload is required to do circular scanning, both positioning means will have flex pivots, seen as 54 and 64. However, if the payload is required to do linear and raster scanning, only the positioning means in the scan axis (means 56) will have a flex pivot (54 in this case). In this instance RUMs are mounted on the payload as illustrated in FIG. 5. As in the single gimbal apparatus of FIG. 1 wherein the payload is in a single gimbal device, payload 50 in the double gimbal apparatus is disposed in inner gimbal 52 using journaled axle 53 and flex pivot 54. Opposite outer sides of inner gimbal 52 are similarly connected to opposite insides of the outer gimbal 59 using axle 61 and flex pivot 64. When the payload is so gimballed in two axes, the axes will be perpendicular to each other as shown. Referring to FIG. 5, payload 50 moves about a horizontal axis, and inner gimbal 52 moves about a vertical axis. This inner gimbal, thus, is carried by vertical rotatable shaft 61 secured to space platform 60 and supported in bearings 62. On its opposite (top) end flex pivot 64 is disposed between the inner gimbal 52 and outer gimbal 59.

The operation of the device in circular scanning thus requires not only both gimbals, but both flex pivots. In addition, to generate a circular scan pattern, the RUM devices 57 must be mounted so that their axes of rotation are parallel with the line of sight axis. In the device of FIG. 1 the RUMs rotate in an axis parallel to the scan axis. The RUM devices can be mounted so that their spin axes are either parallel with the line-of-sight axis or perpendicular to it, producing circular or line scan patterns, respectively. As illustrated in FIGS. 4 and 6 the pair of RUM devices 30 are situated generally on each end of the payload opposite gimbal means 4. Such RUM devices are positioned, one on each side of the line of sight. The planes of rotation of mass members 57 of each RUM device are respectively parallel. At the same time, the line of sight is perpendicular to such planes of rotation. It is necessary that each of the RUM devices operate at the same constant angular velocity, and that their angular positions be so controlled that they are 180 degrees out of phase. During this operation the center of scan of inner gimbal 52 will be measured, and the stepper motor of positioning means 63 will rotate or turn flex pivot 64 until gimbal 52 is in its desired position. Similarly an encoder, a stepper motor and gear train making up positioning means 56 will effect the partial rotation of flex pivot 54 to position or reposition payload 50.

It can be seen that the suspension system of this invention is particularly suited to applications where low cost, weight, and power are more important than precise scan accuracy. The repositioning means is simpler and cheaper than previously employed auxiliary control systems. Flex pivots, as has been indicated, have been used, but such use has been to isolate vibrations, as in motor mounts, and the like, and to correct system anomalies or functions such as friction. It is emphasized that herein the flex pivot is rotatable to position or reposition the payload. Thus, it is employed, not for vibration suppression, but for its spring action. Referring to FIG. 2, it can be seen that flex pivot 14 is embedded in gear train 20. When step commands are received by stepper motor 22, and gear train 20 rotates in response, it turns the flex pivot. The flex pivot thus is an element of the positioning means, an element of the invention. As such its spring constant in the scan axis, $K_{fp}$ can be chosen to enhance the operation. As an example, in some applications, it will be desirable to choose the spring constant of the flex pivot in the scan axis so the resonant frequency, $\sqrt{K_{fp}/I_p}$ is below the payload scan frequency. When so chosen the flex pivot will not affect the motion created by the RUM devices. It serves only to provide a low-amplitude low-frequency restoring torque to keep the center-of-scan from drifting. Adjustable trim masses and viscously-coupled inertial dampers, to be discussed as options, need not be considered in this instance.

An important facet of this invention is that amplification can be achieved through use of the flex pivot. In this instance a flex pivot spring constant is selected so that the resonant frequency matches the scan frequency. When the scan frequency is tuned to the resonant frequency $\sqrt{K_{fp}/I_p}$ the scan is amplified. Consider the following example.

EXAMPLE

In this example each RUM has a 5 lb mass on a 0.5 ft lever arm. The RUM torque motor constant is 0.61 ft-lb/$\sqrt{watt}$. Consequently, 17 watts or less is required to counteract the gravity torque on the RUM mass. If the positioning means of this invention, including the flex pivot, were used in place of the conventional feedback auxiliary control system and the flex pivot amplified the scan by 10×, then the RUM mass will be reduced to 0.5 lb and the power required to counteract the gravity torque to 0.17 watts. Two RUM devices reduce the system weight by 9 lb and the peak power by 34 watts, which are significant where weight and power are critical. Circular scanning using conventional gimbal torquers requires 1376 watts in the worst case orientation in one-g. Using RUM devices and a conventional feedback auxiliary control system requires 42 watts. Using RUM devices and the flex pivot control mechanism of this invention will require only 8 watts.

It can be seen that by the practice of this invention RUMs having less mass and smaller sizes can be utilized to achieve the same sized scan. For example, if the flex pivot amplifies the scan by 10×, the masses of the RUM devices can be reduced by that factor. Scanning in one-g reduces the power required by the RUM devices, since most of the power is needed to counteract the gravity torque acting on the RUM masses. Reducing the RUM mass by 10×, lowers the gravity torque on the RUM-by that amount. Since the motor torque to counteract this disturbance is reduced by the 10× and motor power is proportional to current squared, the power required by the RUM motor to counteract this torque is reduced by 100×.

Summarizing, the invention herein amplifies the scan pattern, allowing smaller RUM devices requiring less power to be used. It permits open loop operation for positioning/repositioning the scan to keep it from drifting. In addition, the holding torque of the stepper motor, amplified by the gear train when desired, keeps the scan from drifting.

Having been given the teachings of this invention, variations and ramifications will occur to those skilled in the art. Thus, to maximize the scan amplitude when using the suspension system of this invention, adjustable trim masses on lead screws can be added to the payload. This embodiment of the invention is illustrated in FIG. 6. Trim masses 65 ride on lead screws 66 as shown in that figure. Also shown are positioning means 19, flex pivot 14 and RUM masses 30. Lead screws 66 carrying trim masses 65 which are internally threaded to ride across the lead screws. It can be seen, then, that trim adjustments are made by rotating trim masses 65 one direction or the other. With the payload in a scanning mode, the operator issues open loop commands to drive the trim masses in the appropriate direction, while observing the output a payload provided sensor. When the scan amplitude is maximized, he stops the trim masses. Hence, the scan frequency can be varied by changing the RUM angular velocity and the trim masses adjusted for optimum scanning.

Conditions may also be such that it may be desirable to increase the damping in the system. This will reduce the maximum scan amplitude, and it will also improve the stability and robustness of the system. This feature is illustrated in FIG. 7 which shows linear viscosity-coupled inertial dampers 72 mounted near the ends of the payload. When scanning is completed or temporarily terminated to change targets, additional damping will allow the system to settle out faster. Damping can be readily increased by mounting linear viscously-coupled inertial dampers 72 on the payload 50 as shown in FIG. 7. These consist of a small mass 70 enclosed in a viscous fluid inside a sealed cavity. Springs 74 keep the mass centered in the cavity and can be chosen so the damper spring-mass system is tuned to a particular scan frequency. Mounting them on the end of the payload maximizes viscous damping because the payload linear velocity is greatest at the ends. The resulting damping force also utilizes the mechanical advantage of the large distance to the payload's center-of-mass, thus maximizing the damping torque.

As another variation of the invention moveable trim masses can be mounted on the payload to tune the payload/flex-pivot spring-mass system to the scan frequency in order to maximize the scan amplitude. This feature is also illustrated in FIG. 7. It can be seen that trim masses 65 are employed in combination with the linear viscosity-coupled inertial dampers 72. The trim mass system can be either set by visual observation of the scan amplitude or programmed to perform the process automatically.

It will also occur to those skilled in the art that for applications where the center-of-scan is to be positioned accurately and automatically, a feedback controller can be added to the suspension system of the invention using the position feedback signals to control the stepper motor. In place of the stepper motor, a torque motor can be used to provide the restoring torque to center the scan. In addition it will be obvious that as an alternative to the encoder, a resolver or potentiometer can be used to measure the position of the scan center. The resolver or potentiometer will provide a continuous analog signal which will increase system accuracy without extra cost. The potentiometer will be especially appropriate in extremely low-cost applications.

Because the basic suspension system of the invention has no feedback loops, stability is not a concern when the system is sufficiently augmented with passive dampers. During scanning it functions passively and, consequently, requires no synchronization of commands between the RUM devices and the auxiliary controller as do the previously described conventional auxiliary control systems. As indicated precise knowledge of the payload and RUM parameters is not necessary. Consequently the suspension system of the invention can be more robust and it will work better over a wider range of operating conditions. Since the suspension system of the invention functions without a digital computer, achievable scan rates are not limited by a sampling rate as in a feedback type auxiliary control system implemented with a digital computer. Higher scan rates are possible. As a result, the devices can be utilized in testing and calibrating sensors like sun sensors, star trackers, magnetometers, rate gyros, and accelerometers over a wide range of frequencies and amplitudes.

Depending on the application, it may not be necessary to use a gear train in the suspension system of the invention. For example, with small payloads, the holding torque of the stepper motor alone may be enough to keep the scan from drifting. The stepper motor can, then, make the flex pivot adjustments.

Although one form of flex pivot has been illustrated, flexural pivots are well known. They generally consist of three basic elements: flexures, a core and an outer housing. Herein the housing has been eliminated. Examples are one element, two element, symmetrical and unsymmetrical flexural pivots. Clearly, then, other flex pivots are within the contemplation of this invention. Such modifications, and those which have been discussed, are deemed to be within the scope of this invention.

Previously defined auxiliary control systems are complicated and expensive. They require a feedback control system with a control computer. The RUM devices rate and position commands require synchronization with the commands to an auxiliary control system. As a consequence, the RUM physical parameters such as mass, lever arm, and distance, must be accurately known. Likewise, the spacecraft or payload inertias must be accurately known. As with all feedback control systems, stability is a constant concern and can become a serious problem. With a digital feedback controller, the maximum scan frequency is limited by the computation cycle time of the digital computer. The invention herein eliminates these components, and, as pointed out, also uses less power and weight when properly tuned to the scan frequency. Because the power requirements are extremely low, scanning large payloads will be feasible using small batteries or solar cells as a power source. The invention will also find utility in fighting forest fires, automated spray painting, spray painting with robot arms, spraying liquid fertilizer on large farms, medical scanning apparatus and the like.

What is claimed is:

1. Suspension means for payloads rotatably supported in gimbals wherein payload rotation is restricted so that the payload moves in a scan pattern, comprising a gimbal, a payload to be supported in the gimbal, a first axle means having one end attached to one side of the payload and its other end attached to the gimbal, a second axle means having one end attached to the gimbal, and its other end attached to the other side of the payload, the first axle means having one of its ends journaled to permit payload rotation, the second axle means being a flex pivot, flexible about a torsional moment, but inflexible about bending moments to restrict said rotation, drive means effecting rotation of the payload, the rotation of the payload being limited by the torsional spring constant of the flex pivot so that the drive means imparts only an oscillatory motion to the payload to effect its scan pattern, positioning means coupled with the flex pivot, the positioning means being adapted to hold the flex pivot in a fixed position and to turn the flex pivot when the positioning means are actuated.

2. The suspension means of claim 1 wherein the payload is supported in a single gimbal and the positioning means is a stepper motor.

3. The suspension means of claim 2 wherein the means imparting the oscillatory motion to the payload is a torque motor.

4. The suspension means of claim 2 wherein the positioning means is a stepper motor in combination with a gear coupled with the flex pivot.

5. The suspension means of claim 4 wherein the means imparting the oscillatory motion to the payload is a pair of rotating unbalanced mass devices.

6. The suspension means of claim 4 wherein gimbal mounting means hold the single gimbal on a space platform.

7. A suspension means including the single gimbal suspension means of claim 4 within an outer gimbal, wherein axle means rotatably support one side of the single gimbal in the outer gimbal, and wherein a flex pivot supports the opposite side of the single gimbal in the outer gimbal in an axis perpendicular to the single gimbal axis, and wherein a second positioning means are coupled with that flex pivot.

8. The suspension means of claim 7 wherein the positioning means is a stepper motor in combination with gear means coupled with the flex pivot, and wherein gimbal mounting means hold the outer gimbal on a space platform.

9. A scanning apparatus comprising a single gimbal, a scanning device to be supported in the gimbal, a first axle means having one end attached to one side of the scanning device and its other end attached to the gimbal, a second axle means having one end attached to the gimbal, and its other end attached to the other side of the scanning device, the first axle means having one of its ends journaled to permit scanning device rotation, the second axle means being a flex pivot restricting said rotation to effect oscillation of the scanning device, the flex pivot being flexible about a torsional moment, but inflexible about bending moments, the rotation of the scanning device being limited by the torsional spring constant of the flex pivot, a pair of rotating unbalanced mass devices mounted on the scanning device to impart the oscillatory motion to the scanning device to effect a scan of a given frequency, a gear train coupled with the flex pivot to hold the flex pivot in a fixed position and a stepper motor driving the gear train to turn the flex pivot when the stepper motor is actuated.

10. The scanning apparatus of claim 9 wherein the spring constant of the flex pivot is such that the flex pivot resonance frequency matches the scan frequency.

11. The scanning apparatus of claim 9 wherein adjustable trim means are carried by the payload.

12. The scanning apparatus of claim 9 wherein damping means are mounted on the payload.

13. The apparatus of claim 9 wherein the single gimbal is mounted within an outer gimbal, with axle means rotatably supporting one side of the single gimbal in the outer gimbal, and a flex pivot supporting the opposite side of the inner gimbal in the outer gimbal in an axis perpendicular to the single gimbal axis so that the rotating unbalanced masses impart to the device a predetermined circular scan pattern.

* * * * *